(12) United States Patent
Kim

(10) Patent No.: US 7,290,390 B2
(45) Date of Patent: Nov. 6, 2007

(54) TRAVEL CONTROL DEVICE FOR EXCAVATORS

(75) Inventor: Hyeong Ho Kim, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 75 days.

(21) Appl. No.: 11/322,276

(22) Filed: Dec. 29, 2005

(65) Prior Publication Data

US 2006/0156716 A1 Jul. 20, 2006

(30) Foreign Application Priority Data

Dec. 31, 2004 (KR) ............ 10-2004-0117899

(51) Int. Cl.
*F16H 61/46* (2006.01)
*F16H 61/40* (2006.01)
(52) U.S. Cl. ............... 60/445; 60/427; 60/484
(58) Field of Classification Search ............ 60/427, 60/443, 444, 445, 484
See application file for complete search history.

(56) References Cited

U.S. PATENT DOCUMENTS 4,354,420 A * 10/1982 Bianchetta ............ 60/484

5,085,052 A * 2/1992 Kawanaka et al. ........... 60/445
5,331,812 A * 7/1994 Imai ........................ 60/450
6,609,368 B2 * 8/2003 Dvorak et al. ............... 60/427
6,857,494 B2 * 2/2005 Kobayashi et al. .......... 180/243

FOREIGN PATENT DOCUMENTS

JP 2004340259 A * 12/2004

* cited by examiner

*Primary Examiner*—Thomas E. Lazo
(74) *Attorney, Agent, or Firm*—Lee, Hong, Degerman, Kang & Schmadeka

(57) ABSTRACT

A travel control device enables a crawler type hydraulic excavator to start slowly regardless of the preset speed ratio whenever the manipulation amount of a manual travel control device is small. The travel control device includes left and right travel motors respectively provided with speed changing mechanisms, a high speed shifting valve provided on a high speed signal line for cutting off or transmitting a high speed signal pressure to the speed changing mechanisms, a travel signal detection means for detecting a travel control signal pressure outputted from manual travel control devices. A shutoff valve is provided on the high speed signal line for closing or opening the high speed signal line to keep the speed changing mechanisms in a low speed condition or a high speed condition depending on the magnitude of the travel control signal pressure supplied from the travel signal detection means.

5 Claims, 3 Drawing Sheets

TRAVEL CONTROL DEVICE FOR EXCAVATORS

This application claims the benefit of the Korean Patent Application No. 10-2004-0117899, filed on Dec. 31, 2004, which is hereby incorporated by reference as if fully set forth herein.

BACKGROUND OF THE INVENTION

1. Field of the Invention

The present invention pertains to a travel control device for excavators and, more specifically, to an excavator travel control device for controlling a starting speed of an excavator operable with a low speed travel mode and a high speed travel mode.

2. Description of the Related Art

A crawler type hydraulic excavator, one of typical heavy construction equipments, is provided with a travel control device as schematically illustrated in FIG. 1. The travel control device includes a couple of main fluid pumps 101, 102 each rotatingly driven by an engine 103 to discharge hydraulic flows. The hydraulic flows thus discharged are supplied to left and right travel motors 105, 106 under a control of travel control spools 111, 112 of a main control valve block 110 so that the travel motors 105, 106 can be rotated to move the excavator forwards or rearwards. A manual travel control device 120 is provided to control the pressure and flowing direction of a hydraulic flow discharged by an auxiliary pump 104, thus generating travel control pilot pressures (X1, X2, Y1, Y2) which are to be applied to and shift the travel control spools 111, 112.

Speed changing mechanisms 107, 108 are respectively attached to the left and right travel motors 105, 106 for lowering or raising the rotating speeds of the travel motors 105, 106. The speed changing mechanisms 107, 108 are connected to the auxiliary pump 104 via a high speed signal line 117 and serves to increase the rotating speed of the travel motors 105, 106 upon receipt of a high speed signal pressure from the auxiliary pump 104. A high speed shifting valve 116 is provided on the high speed signal line 117 to open or close the high speed signal line 117 as a selection switch 115 is turned on or off.

Depending on the kinds of hydraulic excavators, the travel speed is controlled not merely by two modes, i.e., a low speed mode and a high speed mode, but by three modes, i.e., a fixed low speed travel mode, a fixed high speed travel mode and an automatic high speed travel mode.

The excavator is always started and stopped at a low speed in the fixed low speed travel mode but the starting and stopping occurs at a high speed in the fixed high speed travel mode. In the automatic high speed travel mode, the excavator normally moves at the high speed and is automatically shifted down to the low speed to produce an increased torque if the excavator encounters a great travel load. As soon as the travel load is reduced to below a predetermined value, the excavator returns back to the high speed travel condition.

One conspicuous drawback of such travel system is that, even though an operator so wishes, it is intrinsically impossible to make slow start in the fixed high speed travel mode and the automatic high speed travel mode.

The operator usually drives the excavator faster in case where the excavator has to be moved long distance from one working place to another. In the event that there exists a need to finely control the movement of the excavator, as in case of conducting a work with a bulldozer blade while moving the excavator back-and-forth, the excavator should be moved slowly.

If the operator who has an intention to move the excavator slowly makes a mistake of starting the excavator in one of the fixed high speed travel mode and the automatic high speed travel mode, the excavator is rushed forward against the operator's intention, thus embarrassing the operator and sometimes causing an accident due to the uncontrollable starting speed. This is particularly true in a caterpillar vehicle such as a crawler type hydraulic excavator.

SUMMARY OF THE INVENTION

Taking into account the afore-mentioned and other problems inherent in the prior art travel control devices, it is an object of the present invention to provide a travel control device for excavators that can control the starting speed of an excavator in proportion to the manipulation amount of a travel control lever even when the excavator is started in a high speed travel mode.

With this object in mind, one aspect of the present invention is directed to a travel control device for excavators, comprising: at least one main fluid pump and an auxiliary pump each for discharging a hydraulic flow; left and right travel motors driven by the hydraulic flow of the main fluid pump and respectively provided with speed changing mechanisms; travel control spools for controlling the hydraulic flow to the left and right travel motors; manual travel control devices for receiving the hydraulic flow from the auxiliary pump and supplying a travel control signal pressure to the travel control spools; a high speed shifting valve provided on a high speed signal line interconnecting the auxiliary pump and the speed changing mechanisms for cutting off or transmitting a high speed signal pressure to the speed changing mechanisms; a travel signal detection means for detecting the travel control signal pressure outputted from the manual travel control devices; and a shutoff valve provided on the high speed signal line in a serial relationship with the high speed shifting valve for closing the high speed signal line to keep the speed changing mechanisms in a low speed condition if the travel control signal pressure supplied from the travel signal detection means is no greater than a predetermined pressure value and for opening the high speed signal line to keep the speed changing mechanisms in a high speed condition if the travel control signal pressure supplied from the travel signal detection means exceeds the predetermined pressure value.

In a travel control device of the present invention, it is preferred that the travel signal detection means comprise a shuttle valve for sensing the travel control signal pressure outputted from the manual travel control devices.

In a travel control device of the present invention, it is preferred that the shutoff valve be provided with a shutoff spool shiftable between a closing position and an opening position and a spring disposed at one side of the shutoff spool for resiliently biasing the shutoff spool into the closing position, and the travel control spools be provided with springs for biasing each of the travel control spools into a neutral position, the spring of the shutoff valve having a greater spring constant than the respective springs of the travel control spools.

In a travel control device of the present invention, it is preferred that a selection valve be further provided on the high speed signal line in between the high speed shifting valve and the shutoff valve and a switch for, when activated, shifting the selection valve into a bypass position where a pump-side extension part of the high speed signal line upstream the shutoff valve is connected through a bypass signal line to a motor-side extension part of the high speed signal line downstream the shutoff valve.

Another aspect of the present invention is directed to a travel control device for excavators, comprising: at least one main fluid pump and an auxiliary pump each for discharging a hydraulic flow; left and right travel motors driven by the hydraulic flow of the main fluid pump and respectively provided with speed changing mechanisms; travel control spools for controlling the hydraulic flow to the left and right travel motors; electric travel control devices for generating an electric current in proportion to the amount of displacement thereof; a high speed shifting valve provided on a high speed signal line interconnecting the auxiliary pump and the speed changing mechanisms for cutting off or transmitting a high speed signal pressure to the speed changing mechanisms; a travel signal detection means for detecting the magnitude of the electric current outputted from the electric travel control devices; and a solenoid-operated shutoff valve provided on the high speed signal line in a serial relationship with the high speed shifting valve for closing the high speed signal line to keep the speed changing mechanisms in a low speed condition if the electric current detected by the travel signal detection means is no greater than a predetermined current value and for opening the high speed signal line to keep the speed changing mechanisms in a high speed condition if the electric current detected by the travel signal detection means exceeds the predetermined current value.

According to the present invention as summarized above, the travel control device enables a crawler type hydraulic excavator to start slowly every time regardless of the speed ratio selected in the process of preceding travel operations.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Now, preferred embodiments of a travel control device for excavators in accordance with the present invention will be described in detail with reference to the accompanying drawings.

Figure 1:
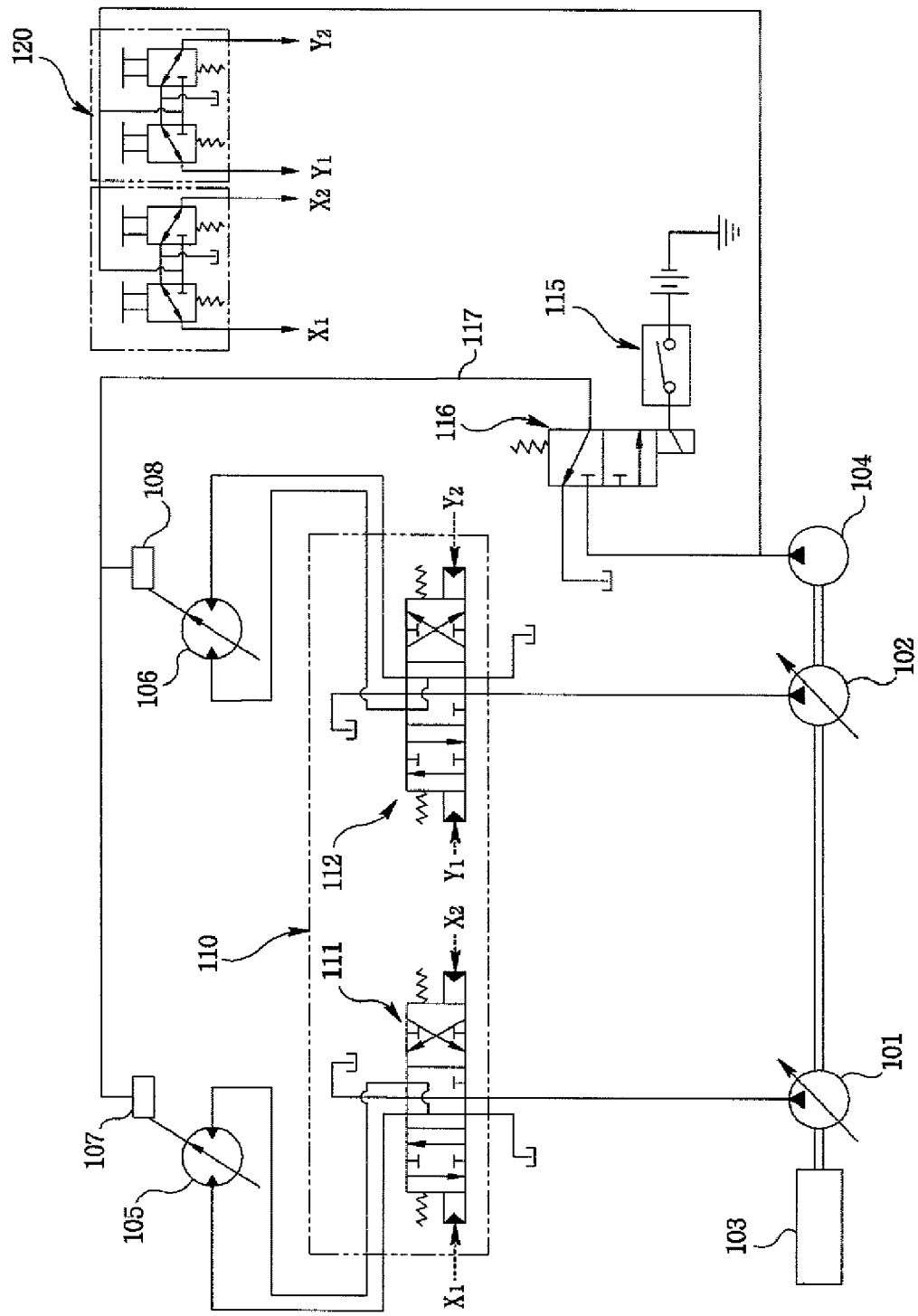
FIG. 1 is a schematic fluid pressure circuit diagram showing a prior art travel control device for excavators.
Figure 2:
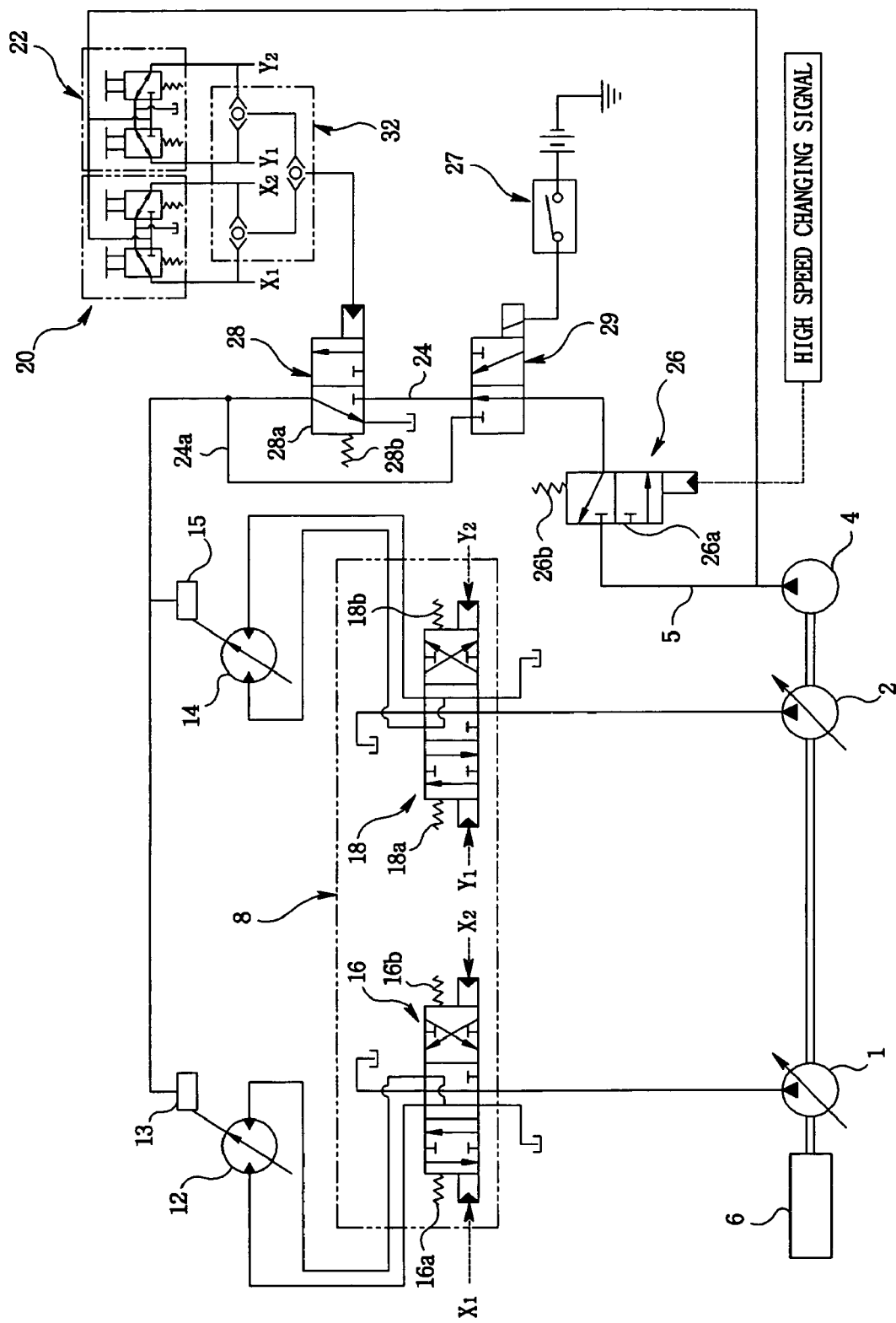
FIG. 2 is a schematic fluid pressure circuit diagram showing a travel control device for excavators according to a first embodiment of the present invention.

FIG. 2 is a schematic fluid pressure circuit diagram showing a travel control device for excavators according to a first embodiment of the present invention. As shown in FIG. 2, a travel control device of the first embodiment includes a couple of main fluid pumps 1, 2 and an auxiliary pump 4 each rotatingly driven by an engine 6 for discharging a hydraulic flow.

The hydraulic flows discharged by the main fluid pumps 1, 2 are controlled by a plurality of control spools, including left and right travel control spools 16, 18, in a main control valve block 8 and then supplied to a plurality of hydraulic actuators, including left and right travel motors 12, 14, to thereby actuate the hydraulic actuators.

The hydraulic flow produced by the auxiliary pump 4 is supplied to manual travel control devices 20, 22 through a fluid pressure line 5. Responsive to manipulation by an operator, the manual travel control devices 20, 22 reduces the pressure of the hydraulic flow produced by the auxiliary pump 4 and supplies to the pressure receiving parts of the travel control spools 16, 18 a travel control signal pressures X1, X2, Y1, Y2 whose magnitudes are proportional to the manipulation amounts of the manual travel control devices 20, 22.

The travel control spools 16, 18 are shifted in one direction by the action of the travel control signal pressures X1, X2, Y1, Y2 to supply the hydraulic flows of the main fluid pumps 1, 2 to the travel motors 12, 14. Springs 16a, 16b, 18a, 18b are disposed at opposite sides of the travel control spools 16, 18 so that they can resiliently bias the travel control spools 16, 18 into their neutral positions and can counteract the travel control signal pressures X1, X2, Y1, Y2 applied to the opposite side of each of the travel control spools 16, 18.

As the manual travel control devices 20, 22 are manipulated to a small moving extent with the excavator kept in a stopped condition, a relatively small magnitude of travel control signal pressures X1, X2, Y1, Y2 are generated and applied to the pressure receiving parts on one sides of the travel control spools 16, 18. The travel control spools 16, 18 remain not shifted until and unless the travel control signal pressures X1, X2, Y1, Y2 become greater than the biasing force of the springs 16a, 16b, 18a, 18b. If the manipulation amounts of the manual travel control devices 20, 22 are gradually increased to such an extent that the travel control signal pressures X1, X2, Y1, Y2 can overcome the biasing force of the springs 16a, 16b, 18a, 18b, the travel control spools 16, 18 are shifted in one direction to open their flow passageways, thus allowing the hydraulic flow of the main fluid pumps 1, 2 to be supplied to the travel motors 12, 14. This causes the excavator to move forwards or rearwards.

Under this state, if the manual travel control devices 20, 22 are manipulated to a greater extent, the travel control signal pressures X1, X2, Y1, Y2 are proportionally increased to thereby make greater the aperture areas of the travel control spools 16, 18. This increases the fluid quantity of the main fluid pumps 1, 2 supplied to the travel motors 12, 14 thus raising the travel speed of the excavator.

Operatively connected to the travel motors 12, 14 are speed changing mechanisms 13, 15 that serve to shift the rotating speed of the travel motors 12, 14, i.e., the travel speed of the excavator, from a low speed to a high speed. The speed changing mechanisms 13, 15 are in fluid communication with the auxiliary pump 4 through a high speed signal line 24 and a fluid pressure line 5 which is also connected to the inlet ports of the manual travel control devices 20, 22. The speed changing mechanisms 13, 15 function to shift the travel motors 12, 14 from the low speed to the high speed in response to a high speed signal pressure transmitted from the auxiliary pump 4 via the high speed signal line 24. Absent the high speed signal pressure, the speed changing mechanisms 13, 15 keep the travel motors 12, 14 in a low speed operating condition.

A high speed shifting valve 26 is attached to the high speed signal line 24 for cutting off or transmitting the high speed signal pressure to the speed changing mechanisms 13, 15 depending on the presence or absence of a speed changing signal inputted from a high speed selection switch which is usually provided in a cabin of the excavator. The high speed shifting valve 26 is provided with a spool 26a shiftable between a closing position and an opening position and a spring 26b for normally biasing the high speed shifting valve 26 into the closing position. Upon receipt of the speed changing signal from the high speed selection switch, the spool 26a of the high speed shifting valve 26 is shifted into the opening position.

If the high speed shifting valve 26 is shifted into the opening position in response to the speed changing signal from the high speed selection switch, the speed changing mechanisms 13, 15 receive the high speed signal pressure from the auxiliary pump 4 through the high speed signal line 24 to thereby shift the travel motors 12, 14 into the high speed operating condition. To the contrary, if the speed changing signal is removed from the high speed shifting valve 26, the spring 26b pushes the high speed shifting valve 26 into the closing position to cut off the high speed signal line 24. Since the speed changing mechanisms 13, 15 receive no high speed signal pressure from the auxiliary pump 4 in this state, the travel motors 12, 14 are kept in the low speed operating condition.

A travel signal detection means 32 is provided at the outlet sides of the manual travel control devices 20, 22 for detecting the travel control signal pressures X1, X2, Y1, Y2 that the manual travel control devices 20, 22 transmit to the travel control spools 16, 18. On the high speed signal line 24 in between the high speed shifting valve 26 and the speed changing mechanisms 13, 15, a shutoff valve 28 is provided for closing and opening high speed signal line 24 depending on the magnitude of the travel control signal pressures X1, X2, Y1, Y2 detected by the travel signal detection means 32. The shutoff valve 28 is provided with a shutoff spool 28a shiftable between a closing position and an opening position and a spring 28b disposed at one side of the shutoff spool 28a for resiliently biasing the shutoff spool 28a into the closing position. The spring 28b of the shutoff valve 28 has a greater spring constant than the respective springs 16a, 16b, 18a, 18b of the travel control spools 16, 18.

In the present embodiment, the travel signal detection means 32 is composed of a plurality of shuttle valves for sensing the travel control signal pressure outputted from the manual travel control devices 20, 22.

Additionally or optionally, a selection valve 29 is provided on the high speed signal line 24 in between the high speed shifting valve 26 and the shutoff valve 28. And, a selection switch 27 is connected to the selection valve 29 for, when activated or turned on, shifting the selection valve 29 into a bypass position where a pump-side extension part of the high speed signal line 24 upstream the shutoff valve 28 is connected through a bypass signal line 24a to a motor-side extension part of the high speed signal line 24 downstream the shutoff valve 28. If the selection switch 27 is deactivated or turned off, the selection valve 29 assumes a direct connection position where the high speed signal pressure of the auxiliary pump 4 is transmitted to the speed changing mechanisms 13, 15 through the shutoff valve 28.

The travel control device for excavators of the present invention as described above operates as follows.

First of all, in case that the excavator is started after a preceding low speed travel operation, no speed changing signal is applied to the high speed shifting valve 26 and therefore the high speed shifting valve 26 remains in the closing position as shown in FIG. 2 where the high speed signal line 24 is kept cut off to ensure that no high speed signal pressure acts on the speed changing mechanisms 13, 15. This places the travel motors 12, 14 in a low speed condition. If the manual travel control devices 20, 22 are manipulated under this condition to initiate travel of the excavator, the travel motors 12, 14 are caused to rotate at a low speed, thus making the excavator start slowly which would otherwise cause shocks to the excavator.

Secondly, in the event that the excavator is started after a preceding high speed travel operation, the speed changing signal is applied to the high speed shifting valve 26 to thereby bring the high speed shifting valve 26 into the opening position. At this time, the selection switch 27 is kept turned off so that the selection valve 29 can connect the pump-side extension part of the high speed signal line 24 to the shutoff valve 28 and not to the bypass line 24a. Under this state, the high speed signal pressure of the auxiliary pump 4 is not transmitted to the speed changing mechanisms 13, 15 unless the travel control signal pressure from the travel signal detection means 32 grows higher than a predetermined pressure value. This assures that the excavator makes slow start with no shock even though the high speed shifting valve 26 was shifted into the opening position in the preceding travel operation.

In other words, in view of the fact that the respective springs 16a, 16b, 18a, 18b of the travel control spools 16, 18 have a smaller spring constant than the spring 28b of the shutoff valve 28, the travel control spools 16, 18 are first shifted prior to shifting of the shutoff valve 28 into the opening position. Thus the hydraulic flows discharged by the main fluid pumps 1, 2 are supplied to the travel motors 12, 14 under the state that the speed changing mechanisms 13, 15 keep the travel motors 12, 14 in a low speed condition. This makes sure that the excavator is started slowly with no shock.

If the manipulation amounts of the manual travel control devices 20, 22 become greater to such an extent that the travel control signal pressure acting on the shutoff valve 28 can defeat the biasing force of the shutoff spring 28b, the shutoff valve 28 opens the high speed signal line 24 to allow the high speed signal pressure to be transmitted to the speed changing mechanisms 13, 15. Concurrently, an increased quantity of the hydraulic flows are fed to the travel motors 12, 14 from the main fluid pumps 1, 2 because the travel control spools 16, 18 are further shifted by the increased magnitude of the travel control signal pressures X1, X2, Y1, Y2. This enables the excavator at a high speed.

Figure 3:
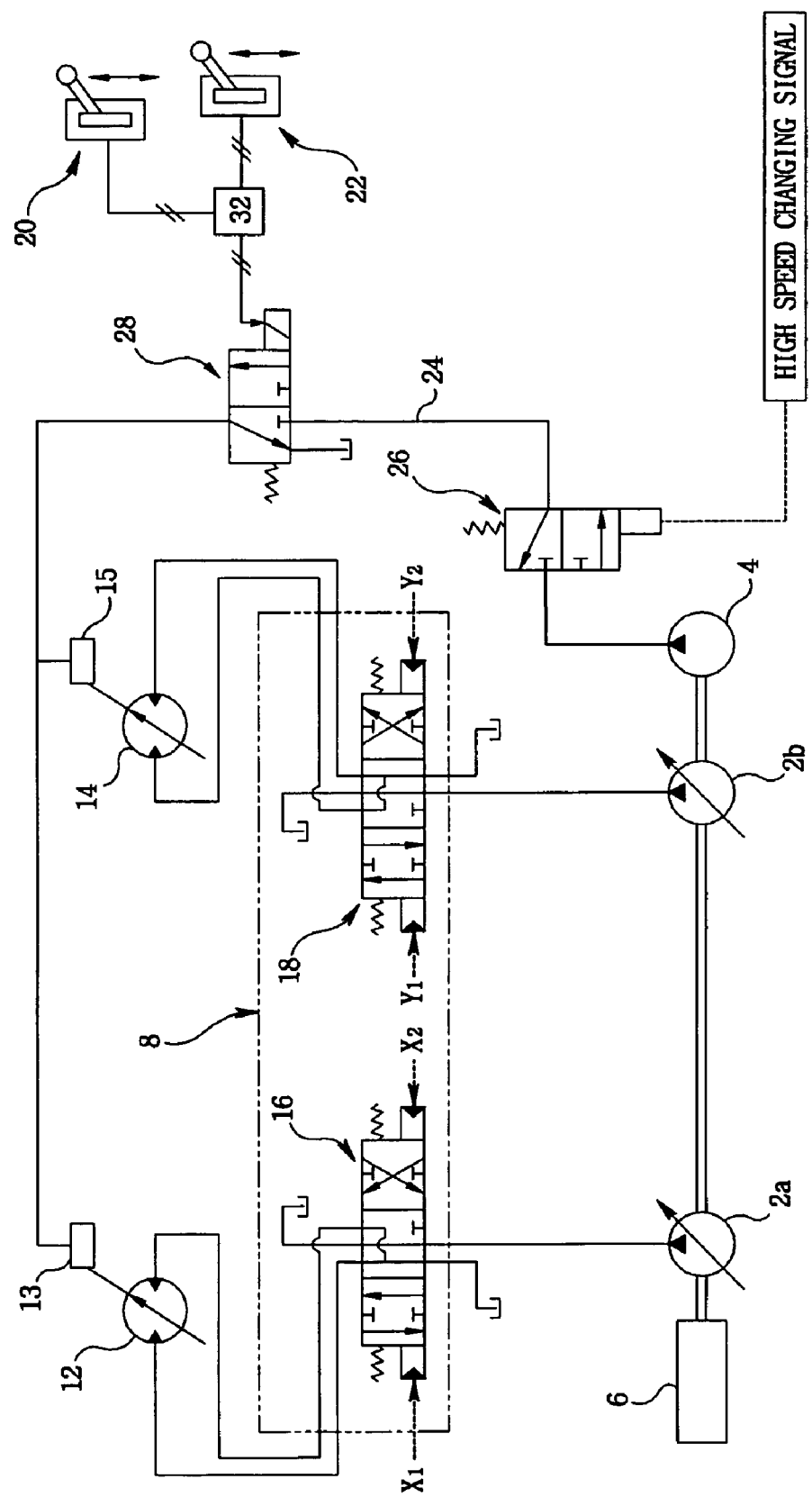
FIG. 3 is a schematic fluid pressure circuit diagram showing a travel control device for excavators according to a second embodiment of the present invention.

FIG. 3 is a schematic fluid pressure circuit diagram showing a travel control device for excavators according to a second embodiment of the present invention. The travel control device of the second embodiment has the same configuration as that of the first embodiment except for the aspects set forth below.

Electric travel control devices 20, 22, e.g., electric joysticks, are employed for generating an electric current in proportion to the amount of displacement thereof. A travel signal detection means 32 is attached to the electric travel control devices 20, 22 for detecting the magnitude of the electric current outputted from the electric travel control devices 20, 22.

A solenoid-operated shutoff valve 28 is provided on the high speed signal line 24 in a serial relationship with the high speed shifting valve 26. The shutoff valve 28 is adapted to close the high speed signal line 24 to keep the speed changing mechanisms 13, 15 in a low speed condition, if the electric current detected by the travel signal detection means 32 is no greater than a predetermined current value, but to open the high speed signal line 24 to keep the speed changing mechanisms 13, 15 in a high speed condition, if the electric current detected by the travel signal detection means 32 exceeds the predetermined current value.

It should be appreciated that the selection valve 29 and the bypass line 24a of the first embodiment are not employed in the second embodiment. Other parts or components of the second embodiment are substantially the same as those of the first embodiment and therefore no description is offered in that regard.

As in the first embodiment described earlier, the travel control device of the second embodiment assures that the solenoid-operated shutoff valve 28 is kept closed at the time of small-extent manipulation of the electric travel control devices 20, 22, thus preventing the high speed signal pressure from being transmitted to the speed changing mechanisms 13, 15 through the high speed signal line 24. This helps avoid a possibility that the excavator is started abruptly against the operator's will and fallen into an uncontrollable condition.

As described in the foregoing, the travel control device of the present invention enables an excavator to start slowly every time regardless of the speed ratio selected in the process of preceding travel operations, owing to the fact that the travel control device is designed to keep travel motors in a low speed condition whenever the excavator initiate its travel.

Although certain preferred embodiments of the present invention have been described herein above, it will be apparent to those skilled in the art that various changes or modifications may be made thereto within the scope of the invention defined by the appended claims.

What is claimed is:

1. A travel control device for excavators, comprising:
    at least one main fluid pump (1, 2) and an auxiliary pump (4) each for discharging a hydraulic flow;
    left and right travel motors (12, 14) driven by the hydraulic flow of the main fluid pump (1, 2) and respectively provided with speed changing mechanisms (13, 15);
    travel control spools (16, 18) for controlling the hydraulic flow to the left and right travel motors (12, 14);
    manual travel control devices (20, 22) for receiving the hydraulic flow from the auxiliary pump (4) and supplying a travel control signal pressure to the travel control spools (16, 18);
    a high speed shifting valve (26) provided on a high speed signal line (24) interconnecting the auxiliary pump (4) and the speed changing mechanisms (13, 15) for cutting off or transmitting a high speed signal pressure to the speed changing mechanisms (13, 15);
    a travel signal detection means (32) for detecting the travel control signal pressure outputted from the manual travel control devices (20, 22); and
    a shutoff valve (28) provided on the high speed signal line (24) in a serial relationship with the high speed shifting valve (26) for closing the high speed signal line (24) to keep the speed changing mechanisms (13, 15) in a low speed condition if the travel control signal pressure supplied from the travel signal detection means (32) is no greater than a predetermined pressure value and for opening the high speed signal line (24) to keep the speed changing mechanisms (13, 15) in a high speed condition if the travel control signal pressure supplied from the travel signal detection means (32) exceeds the predetermined pressure value.

2. The device as recited in claim 1, wherein the travel signal detection means (32) comprises a shuttle valve for sensing the travel control signal pressure outputted from the manual travel control devices (20, 22).

3. The device as recited in claim 1, wherein the shutoff valve (28) is provided with a shutoff spool (28a) shiftable between a closing position and an opening position and a spring (28b) disposed at one side of the shutoff spool (28a) for resiliently biasing the shutoff spool (28a) into the closing position, and wherein the travel control spools (16, 18) is provided with springs (16a, 16b, 18a, 18b) for biasing each of the travel control spools (16, 18) into a neutral position, the spring (28b) of the shutoff valve (28) having a greater spring constant than the respective springs (16a, 16b, 18a, 18b) of the travel control spools (16, 18).

4. The device as recited in claim 1, further comprising a selection valve (29) provided on the high speed signal line (24) in between the high speed shifting valve (26) and the shutoff valve (28) and a selection switch (27) for, when activated, shifting the selection valve (29) into a bypass position where a pump-side extension part of the high speed signal line (24) upstream the shutoff valve (28) is connected through a bypass signal line (24a) to a motor-side extension part of the high speed signal line (24) downstream the shutoff valve (28).

5. A travel control device for excavators, comprising:
    at least one main fluid pump (1, 2) and an auxiliary pump (4) each for discharging a hydraulic flow;
    left and right travel motors (12, 14) driven by the hydraulic flow of the main fluid pump (1, 2) and respectively provided with speed changing mechanisms (13, 15);
    travel control spools (16, 18) for controlling the hydraulic flow to the left and right travel motors (12, 14);
    electric travel control devices (20, 22) for generating an electric current in proportion to the amount of displacement thereof;
    a high speed shifting valve (26) provided on a high speed signal line (24) interconnecting the auxiliary pump (4) and the speed changing mechanisms (13, 15) for cutting off or transmitting a high speed signal pressure to the speed changing mechanisms (13, 15);
    a travel signal detection means (32) for detecting the magnitude of the electric current outputted from the electric travel control devices (20, 22); and
    a solenoid-operated shutoff valve (28) provided on the high speed signal line (24) in a serial relationship with the high speed shifting valve (26) for closing the high speed signal line (24) to keep the speed changing mechanisms (13, 15) in a low speed condition if the electric current detected by the travel signal detection means (32) is no greater than a predetermined current value and for opening the high speed signal line (24) to keep the speed changing mechanisms (13, 15) in a high speed condition if the electric current detected by the travel signal detection means (32) exceeds the predetermined current value.

* * * * *